Jan. 23, 1934.   E. E. WEMP   1,944,337
CLUTCH
Filed Dec. 26, 1930     4 Sheets-Sheet 1
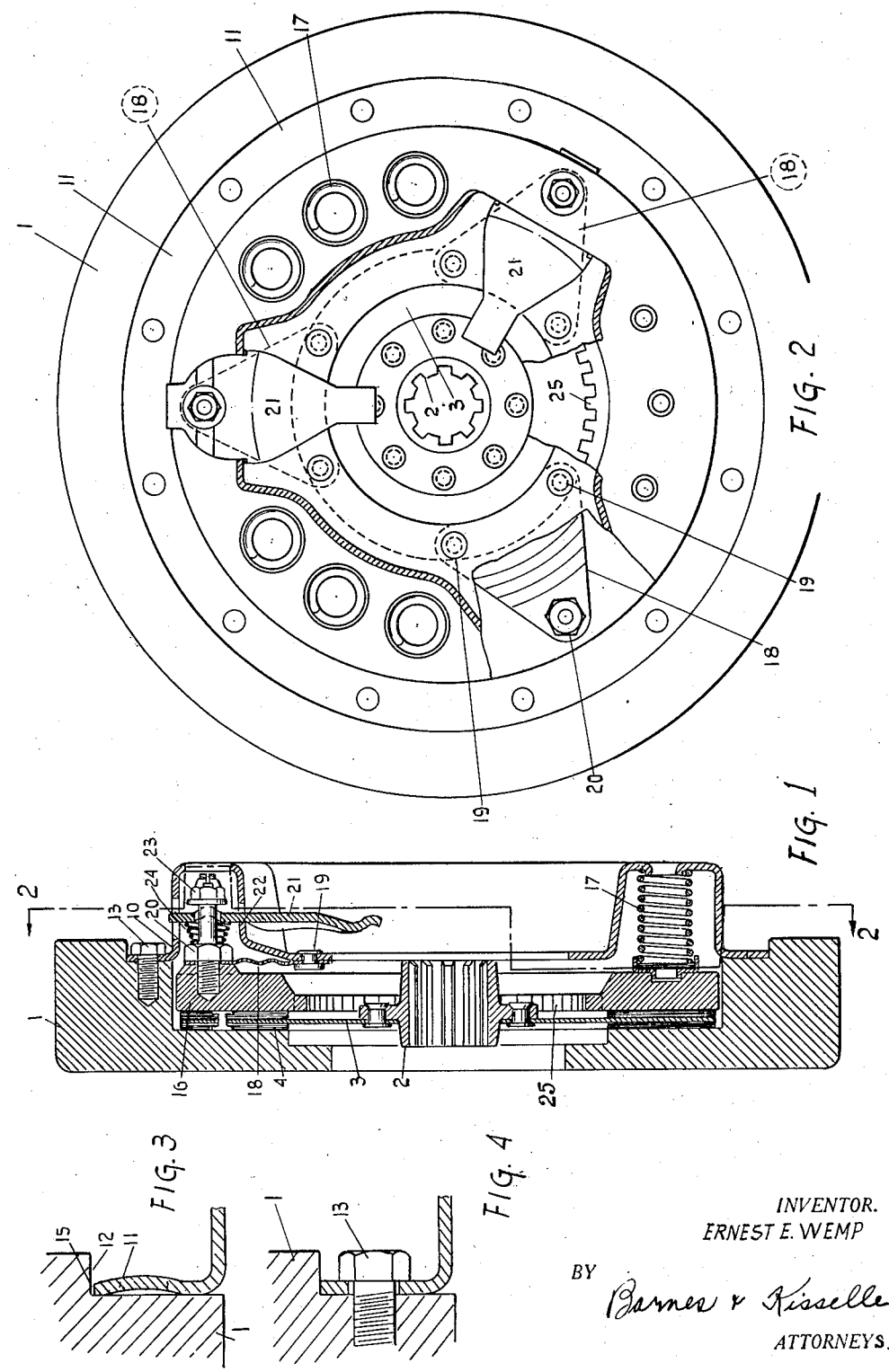
INVENTOR.
ERNEST E. WEMP
BY
Barnes & Kisselle
ATTORNEYS.

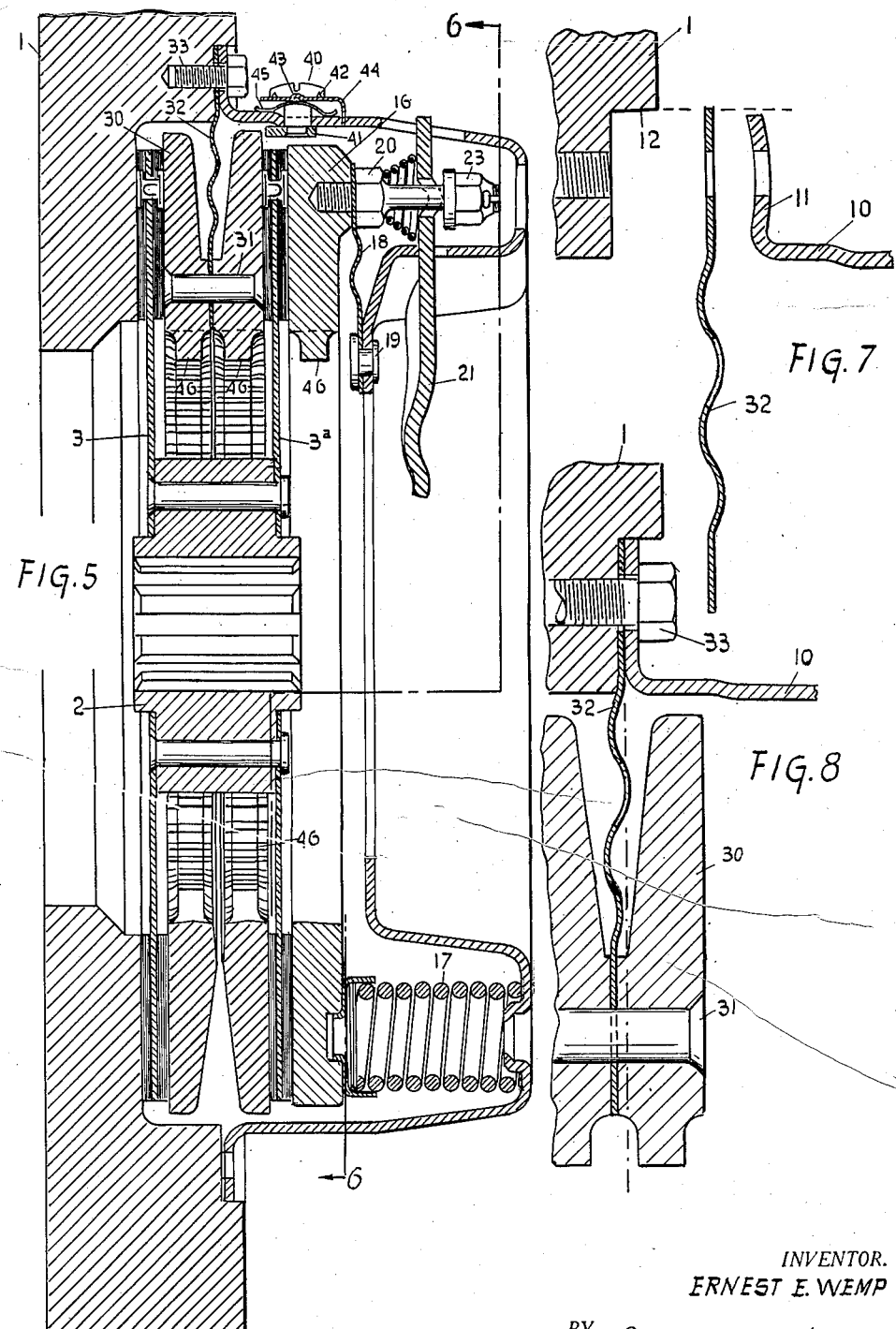

Jan. 23, 1934.  E. E. WEMP  1,944,337
CLUTCH
Filed Dec. 26, 1930  4 Sheets-Sheet 3
FIG. 6
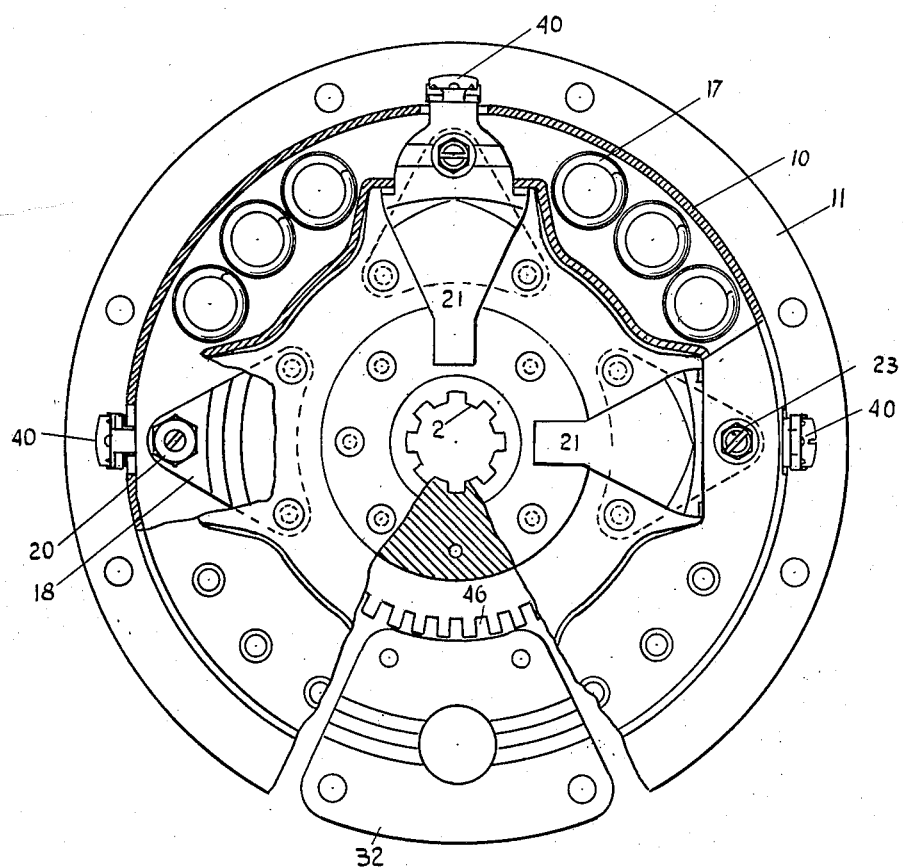
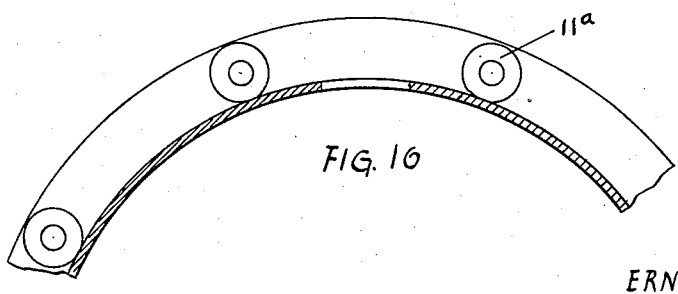
FIG. 16
FIG. 17
INVENTOR.
ERNEST E. WEMP
BY Barnes & Kisselle
ATTORNEYS

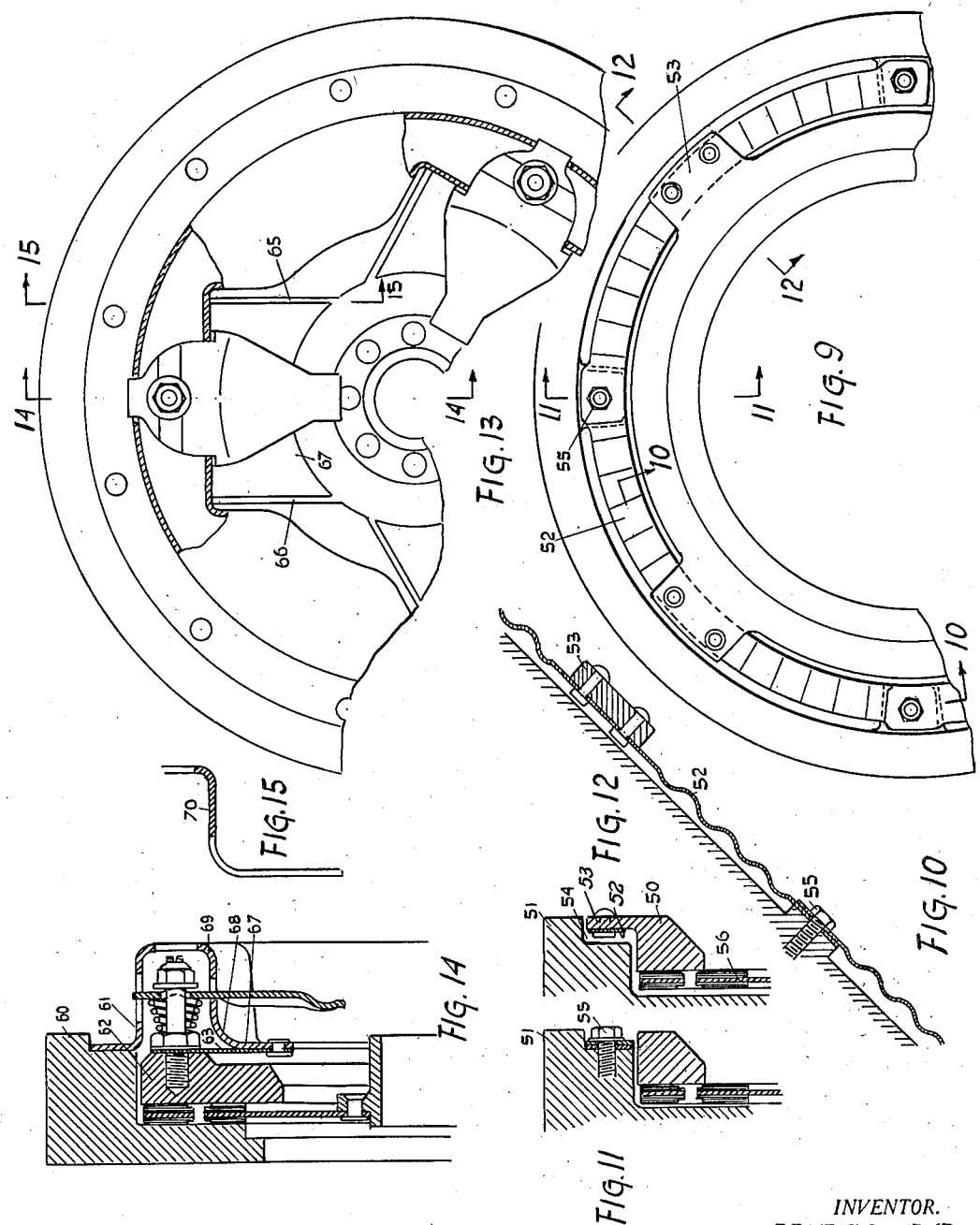

Patented Jan. 23, 1934

1,944,337

UNITED STATES PATENT OFFICE 1,944,337

CLUTCH

Ernest E. Wemp, Detroit, Mich.

Application December 26, 1930
Serial No. 504,841

20 Claims. (Cl. 192—68)

This invention relates to a clutch.

Among the objects of the invention is the provision of a clutch which permits of a nicety of balance which may be effected during clutch installation and maintained during usage. There are other objects of the invention; for example, another object is the provision of a clutch which provides substantially for maximum efficiency in the clutch packing action; in other words, where clutch packing spring or springs are used, the effort or work of the spring or springs is utilized substantially to the maximum. Other objects of the invention will become apparent as the description progresses.

In the drawings:

Fig. 1 is a sectional view taken through a clutch construction made in accordance with the invention.

Fig. 2 is a view taken substantially on line 2—2 of Fig. 1 with some parts cut away to illustrate various structural features.

Fig. 3 is a detail in illustration of a structural arrangement which may be utilized in assembling some of the clutch parts which facilitate balancing the same.

Fig. 4 is a view illustrating parts of Fig. 3 in assembled relation.

Fig. 5 is a sectional view taken through a clutch of double or multiple disc formation illustrating the invention applied to this form of clutch.

Fig. 6 is a view taken substantially on lines 6—6 of Fig. 5, some parts in section and some cut away, illustrating various structural parts.

Fig. 7 is a more or less diagrammatical view in illustration of the relation of some of the parts before assembly.

Fig. 8 is a view illustrating the parts shown in Fig. 7 in assembled relation.

Fig. 9 is a view of a modified construction.

Fig. 10 is a developed section taken substantially on line 10—10 of Fig. 9.

Figs. 11 and 12 are respectively sectional views taken on lines 11—11 and 12—12 of Fig. 9.

Fig. 13 is a view of a further modified form.

Fig. 14 is a sectional view taken substantially on line 14—14 of Fig. 13.

Fig. 15 is a detail in section taken substantially on line 15—15 of Fig. 13.

Fig. 16 shows a modified form of cover plate construction.

Fig. 17 is a developed section of the Fig. 16 structure.

Referring now to the drawings, the clutch is shown in the form of one designed for an automotive vehicle and associated with an engine flywheel. Such engine flywheel is illustrated at 1. The driven parts of the clutch consist of a hub 2 designed to be mounted upon a driven shaft, a driven disc 3 secured to the hub and provided with clutch facing material 4. It is to be understood, of course, that the invention may be utilized in places other than in an automotive vehicle, although that environment is selected for the purpose of illustrating the invention.

The driving parts of the clutch, other than the flywheel, consist of a cover plate 10. This cover plate is provided with a peripheral flange 11 adapted to be secured to the flywheel. The flywheel may be recessed as shown providing a circumferential shoulder 12, and the flange 11 is designed to fit into the recess and be secured to the flywheel by screws 13. The cover plate, when properly held in the recess of the flywheel, may be in balanced relation and to facilitate this balancing and assembly, the flange 11 may be normally crowned or provided with a curved cross-sectional shape as illustrated in Fig. 3. When the bolts 13 are screwed down tightly the crowned flange is flattened out as illustrated in Fig. 4. This effects an increase in the overall diameter of the flange with the result that the peripheral edge of the flange abuts against or substantially jams against the shoulder 12 of the flywheel. This positively positions the cover plate as regards the flywheel with the result that the cover plate is centered during assembly and held centered thereafter. Also assembly is facilitated for a slight clearance is afforded between the peripheral edge of the flange 11 and the shoulder 12 when the cover plate is inserted to position; this is illustrated at 15 (Fig. 3) in an exaggerated manner. Instead of crowning the entire flange it may be crowned or slightly embossed locally, as is shown in Fig. 17, wherein the local crown formations are shown as immediately surrounding the cap screw holes, as at 11a, Fig. 16. Tightening of the cap screws urges outwardly the peripheral edge near the cap screws.

A pressure plate is illustrated at 16 and this may be carried by the cover plate through devices later to be described so that it may move axially. Clutch packing springs are provided and these are shown at 17 positioned between the cover plate and pressure plate. It will be appreciated that when the springs are unrestrained that they move the pressure plate axially so that the friction material of the driven plate is packed between the pressure plate and a portion of the flywheel on the opposite side of the friction material. These pressure springs may be arranged in a rather circumferential manner as illustrated in Fig. 2 and they may be grouped as shown with some space between the groups, which space may be utilized as will presently appear.

The pressure plate 16, as heretofore stated, may be carried by the cover plate, and the carrying means comprises one or more members capable of such flexing and variation as to permit of the movements of the pressure plate, while at the same time, the pressure plate may be held centered or balanced. These driving or carrying members, of which there are three in the present instance, are shown at 18. They are advantageously of sheet metal or plate formation capable of flexing to permit the pressure plate to move axially and also capable of variation in radial length. These members may be of triangular formation, as shown in Fig. 2, riveted or otherwise secured to the cover plate as at 19 and secured to the pressure plate as by means of studs 20 or the like. To release the pressure plate or to in other words retract it against the action of the packing springs 17, suitable releasing levers 21 are provided which fulcrum on the cover plate as at 22 and which may have apertures through which the studs 20 pass, the studs being provided with a nut or the like 23. Small springs 24 may be utilized to hold the nut 23 and the adjacent part of the lever in contact.

It will be appreciated from the above described construction that when the levers 21 are rocked around their fulcrum point in a clockwise direction, that the pressure plate 16 is moved from left to right (referring to Fig. 1) the packing springs are compressed and the clutch released. When the levers are released the packing springs move the pressure plate back with movement from right to left to again engage the clutch. Now, in this action, the pressure plate 16 moves axially as regards the cover plate. Accordingly, the driving members 18 are flexed. Also in this movement it will be noted that, inasmuch as the attaching points 19 are fixed, that is to say, have no movement axially, the attachment points 20 tend to, or rather would tend to move, in somewhat of an arc around the points 19. In other words, if one would picture a detached driving member 18 held securely at point 19 with its outer portions deflected back and forth, the path of movement at its outer edge would be arcuate. Due, however, to the rigidity of the pressure plate the path of movement at the attachment 20 must be in a straight line. Accordingly, the distance center between points 19 and 20 must vary. To accomplish this the driving members 18 are constructed so that they are capable of meeting this variation, or in other words, lengthening or shortening as required. To accomplish this the driving members 18 are preferably designed so that they normally do not traverse the shortest distance between the points 19 and 20, or in other words, do not lie in a straight line. One way of doing this is by effecting a curve formation in the driving members 18 so that the distance between the points 19 and 20 following the curve is greater than the straight line distance between these points. As shown herein the driving members 18 are corrugated. This permits them to elongate or shorten to accommodate for the varying distance between the centers of 19 and 20 as the pressure plate is axially moved.

Now it will be noted that these driving members 18 hold the pressure plate securely so that once centered or balanced it is held in such relation during usage. Heretofore pressure plates have been mounted to reciprocate on pins or studs or other guide devices. With such construction there must be a suitable clearance between the pressure plate and its guide devices in order to permit both of the requisite ease of action and accommodate for expansion and contraction of the metal due to heat changes. With such a construction the necessary clearance permitted the pressure plate to shift radially. This, of course, would throw the pressure plate off center and/or out of balance. The movement of course, was slight, as determined by the amount of clearance, yet sufficient to present a noticeable out-of-balance condition with smooth running machinery. With the present construction the pressure plate is held by the cover plate so that it cannot shift in this respect and in addition to this the cover plate is centered on the flywheel. Accordingly, the initial centered or balanced condition may be maintained.

Another feature which we may call attention to here is that this construction affords high efficiency for the packing springs. To bring this out it is thought advantageous to again refer to the heretofore practice of mounting the pressure plate to reciprocate on guide devices such as pins or studs. When a clutch is being engaged the load is partially picked up as the pressure plate moves under the action of the packing springs, and this load creates friction between the pressure plate and the studs by reason of the pressure plate being driven by these studs or guiding devices. The result of this is that the packing springs were required to overcome this increased friction due to the partial picking up of the load in order to move the pressure plate further in an axial direction to effect complete clutch engagement. Now, with the present construction, the pressure plate does not slide on guide devices where friction may result due to the picking up of a load, with the result that when a load is picked up no additional work is required of the packing springs, and substantially maximum efficiency of the clutch packing springs is attained.

Another point which may be brought out at this time is that the driving plates 18 may be located in the assembly in such a manner as to not interfere with or reduce the number of packing springs required. The releasing levers 21 require some space for their mounting and the packing springs are advantageously arranged in groups divided by the spacing necessary for the releasing levers. The driving members 18 are advantageously and preferably located in this same spacing as shown in Fig. 2. Still another feature is the construction of some of the parts which facilitates their balancing. As shown in Figs. 1 and 2 the pressure plate 16 is provided with a multiplicity of tooth-like projections 25 advantageously disposed at the inner peripheral edge. This permits of the pressure plate to be balanced by merely knocking off one or more teeth where necessary.

The invention, together with other improvements, is shown as embodied in a double or multiple disc clutch in Figs. 5 to 8 inclusive. In these figures some of the principal parts have applied thereto the same reference characters as are applied to Figs. 1 to 4 and they need not be redescribed. The driven hub 2 is provided with two driven discs 3 and 3a. The pressure plate 16 is mounted in a manner similar to the pressure plate shown in Figs. 1 and 2, carried by the cover plate through the means of the driving members 18; the packing springs 17 being arranged as before and capable of compression to disengage the clutch by levers 21.

However, there is an intermediate driving member 30 positioned between the two driven discs. This member 30 may comprise two similar members secured together by rivets or the like 31 and they may be of ring formation. They may be carried by the flywheel through the means of carrying members 32, the inner ends of which may be disposed between the two similar members and held by the rivets 31 and the outer ends of which may be secured to the flywheel. These members 32 are of a construction similar to the driving and carrying members 18 in that they are capable of length variation and in this regard have the corrugated formation. The outer edges of these members 32 are fitted into the flywheel recess, and an advantageous construction is that of providing a radial distance from the axial center to the outer peripheral edge of the members 32 slightly greater than the radial distance from the axial center to the shoulder 12 on the flywheel. This is illustrated in Fig. 7. Accordingly, when this driving member is positioned to the flywheel the members 32 are snapped into place. For this purpose they are all metal having some spring qualities, and due to the construction of the members 32, their over-all length may be slightly shortened during this action. Due to this, the driving member 30 with its carrying members 32 may be nicely centered on the fly-wheel and tightly held in centered position. The flange 11 on the cover plate may be crowned as shown in Fig. 7 and then may be mounted to the flywheel by disposition within the recess and then bolts or studs 33 may be taken through the flange and members 32. Thus the cover plate may be centered as is the case with the form shown in Fig. 1.

In the operation of this clutch the pressure plate moves axially by the action of the levers 21 in a manner similar to the pressure plate in the form shown in Fig. 1. Also to free the driven disc 3 from its pack relation from the flywheel and intermediate member 30 this member 30 must shift axially. The spring-like flexure of the members 32 may be utilized in this action. The parts are so related that when the clutch is engaged the member 30 is pushed up against the driven disc 3 and in this position the members 32 are flexed out of their normal position as illustrated in Fig. 5. When the packing springs are compressed then the members 32 serve to shift the driving member 30 in a direction from left to right (Fig. 5) thus freeing the driven disc 3.

There may be positive stops employed to limit the movement of the driving member 30 in this backing away from the flywheel thus to permit of further backing away movement of pressure plate 16 to insure frictional release of the driven member 3a. A plurality of such stops may be used as illustrated in Fig. 6 but only one need be described. They may take the form of a rotatable member 40 having a head for the reception of a suitable tool mounted in the cover plate and provided on its inner end with an eccentric or cam-like member 41. The under side of the head may be provided with notches 42 adapted to receive projection 43 on a locking member 44, spring actuated as by means of a leaf spring 45. When the release levers are rocked to disengage the clutch, pressure plate 16 is retracted, and driving member 30 retracts by the action of members 32 until the driving member is stopped by the eccentrics 41. Thus disc 3 is disengaged. Further movement of the levers causes further retraction of the pressure plate 16, thus, releasing driven disc 3a. Suitable adjustment is provided for limiting the retracting movement of the driving member 30 and this is accomplished by merely rotating the member 40, the eccentric 41 serving as an adjustable stop. As shown in Fig. 6 four of such adjustable devices may be provided, although this number of stops need not be positively adhered to. It is to be noted that this adjustment in no wise alters the balance of the construction. The adjusting members do not feed in and out as regards the axes but maintain a uniform distance from the axial center so that the centrifugal action of these parts is not varied. This is true even though the adjusting member is swiveled on an axis perpendicular to the axial center of the clutch, or substantially on a radial line. This adjustment feature provides for accurate association of the parts in initial assembly and provides for adjustment if necessary when the facing material becomes worn or is replaced. It will also be noted that some of the parts of the clutch shown in Fig. 5 may be provided with the tooth-like projections 46, some of which may be knocked off to establish a balanced condition.

In Figs. 9 and 10 extensible carrying members are shown wherein the lengthening and shortening action is generally in a circumferential direction as distinguished from a radial direction of the foregoing forms. The movable driving member 50, which may be a pressure ring, is attached to a flywheel or the like 51 through extensible and contractible members 52. These members are corrugated substantially on radial lines. The member 50 may have a projection or the like 53 to which a member 52 is attached as shown, and one member may be attached substantially centrally to the projection 53 and to extend to either side thereof with its ends mounted in recess 54 of the flywheel and secured thereto by a cap screw or the like 55. The ends of the members 52 attached to the flywheel may center the member 50 by being located in the recess 54. Any suitable number of the members 52 may be provided as shown in Fig. 9. The arrangement as shown is to take four of such members. When the movable member 50 is shifted axially it alternately engages and releases driven member 56 and in so doing the members 52 flex and also lengthen and shorten between the points of attachment with the flywheel and the movable member.

Another form is shown in Figs. 13, 14 and 15 wherein the lengthening and shortening action may take place in a member other than the sheet metal flexible member. Referring to Fig. 14 there is shown the flywheel 60 and cover plate 61, and pressure ring 62 carried by a flexible sheet metal member or plate 63. The member 63 is not arranged for extension and contraction, but the cover plate is designed to flex to take care of the variation in distances between the two points of attachment. The cover plate may be slotted as at 65 and 66 to form a piece 67 defined by the slots to which the plate 63 is secured. In the axial shifting operation of the pressure ring 62, the piece 67 is capable of radial shifting with a slight bending action in the cover plate stock which may take place in the curve 68 in the corner 69 or portion 70, or take place in part in all three of these sections. The cover plate stock while relatively stiff is capable of permitting the slight movement necessary.

In the claims appended hereto which use the term flywheel, it is to be understood that such use is in a broad sense and is intended to cover a rotary clutch driving member although it may not constitute the only element in the nature of a flywheel.

I claim:

1. In a clutch, a rotatable driving member shiftable axially to engage and disengage the clutch, a rotatable carrying member, one or more sheet metal members connected to the carrying member and connected to the said driving member with said points of connection disposed different distances from the axial center of the clutch, said sheet metal members arranged to hold the rotatable driving member centered to maintain balance, said sheet metal member or members being flexible to permit the relative axial movement between the driving member and the carrying member, said sheet metal member or members being corrugated whereby the same are capable of extending and shortening.

2. In a clutch, the combination of a rotary driving member, a rotary driven member, an axially shiftable driving member to engage and release the driven member, one or more radially disposed carrying members having one end connected with the first mentioned driving member and having the opposite end connected with the second mentioned driving member and being flexible to permit of the axial shifting and arranged to hold the second mentioned driving member centered and balanced, said carrying member or members being of such formation as to have a length between the two said points of connection greater than the shortest distance between these points.

3. In a clutch, the combination of a rotary driving member, a rotary driven member, an axially shiftable driving member to engage and release the driven member, one or more radially disposed carrying members having a connection at opposite ends with the first mentioned driving member and with the second mentioned driving member and being flexible to permit of the axial shifting and arranged to hold the second mentioned driving member centered and balanced, said carrying member or members being provided with circumferentially extending wave-like formation whereby said member or members may accommodate for varying straight line distances between the two said points of connection.

4. In a clutch, the combination of a flywheel, a cover plate carried thereby, a driven member, an axially shiftable pressure plate, all of which are rotatable and a plurality of separate corrugated sheet metal members fixedly secured to the cover plate and pressure plate for carrying the pressure plate and flexible to permit axial shifting of the pressure plate and arranged to hold the pressure plate centered and balanced.

5. In a clutch, the combination of a flywheel, of a clutch cover plate, a driven member, an axially shiftable pressure plate, all of which are rotatable and a plurality of separate plates secured to the cover plate and to the pressure plate for carrying the same and transmitting driving torque, and circumferentially corrugated between the points of connection with the cover plate and the pressure plate and arranged to hold the pressure plate centered and balanced.

6. In a clutch, the combination of a flywheel, a cover plate carried by the flywheel, said cover plate having a part located relatively close to the axial center, a plurality of plates fixedly secured to said part of the cover plate and extending radially outward therefrom, a pressure plate carried by said plates and secured theerto near the outer ends of said plates, said pressure plate being axially shiftable whereby the points of connection between the pressure plate and said plates tend to move in an arc around the points of connection between said plates and the cover plate, said plates being corrugated or of wave-like formation between the points of connection whereby they are capable of length variation between the two points of connection.

7. In a clutch, the combination of a flywheel, a clutch cover plate, a driven member, a pressure plate, a plurality of packing springs between the pressure plate and cover plate circumferentially arranged and disposed in spaced groups, operable means disposed between the groups for shifting the pressure plate against the action of the packing springs to release the clutch, and plate members disposed between the groups of springs connected respectively to the cover plate and pressure plate for carrying the pressure plate.

8. In a clutch, the combination of a flywheel, a clutch cover plate, a driven member, a pressure plate, a plurality of packing springs between the pressure plate and cover plate circumferentially arranged and disposed in spaced groups, operable means disposed between the groups for shifting the pressure plate against the action of the packing springs to release the clutch, and plate members disposed between the groups of springs connected respectively to the cover plate and pressure plate for carrying the pressure plate, said plate members being flexible and of corrugated or wave-like construction.

9. In a clutch, the combination of a flywheel, a cover plate, a driven member, an axially shiftable pressure plate, a plurality of substantially circumferentially arranged packing springs between the cover plate and the pressure plate, said springs being arranged in spaced groups, means for retracting the pressure plate against the action of the springs, and radially disposed plate members positioned between the spaced groups of springs and connected respectively to the cover plate and pressure plate for carrying the pressure plate.

10. In a clutch, the combination of a flywheel, a cover plate, a plurality of driven discs, a plurality of axially shiftable driving members, means for shifting these members to engage and disengage said clutch, and sheet metal carrying members of circumferentially corrugated or wave-like construction connected respectively to the axially shiftable members and cover plate and flywheel.

11. In a clutch, the combination of a flywheel provided with a recess bounded by a circumferential wall, a clutch driving member, plate members secured to the driving member and extending radially outward therefrom, said plate members being of wave-like formation with their outer periphery located a distance away from the axial center greater than the distance from the axial center of said recess wall, said plate members being adapted to be snapped into said recess in the flywheel to position said driving member centered.

12. In a clutch, the combination of a flywheel, an axially shiftable driving member, a driven member, packing springs for shifting the driving member to pack it against the driven member, and flexible sheet metal members carrying the driving member, and normally flexed in clutch engaged position, means for compressing the packing springs to relieve the packing action, said sheet metal members being adapted to flex to retract the driving member from packed position when said packing springs are compressed.

13. In a clutch, the combination of a flywheel, an axially shiftable driving member, radially disposed flexible sheet metal members for carrying the axially shiftable member, packing springs for shifting said member into clutch engaged position, means for compressing the packing springs for disengaging the clutch, said sheet metal members being normally flexed in clutch engaged position and serving to shift said driving member axially when said packing springs are compressed.

14. In a clutch, the combination of a flywheel, an axially shiftable driving member, radially disposed flexible sheet metal members for carrying the axially shiftable member, packing springs for shifting said member into clutch engaged position, means for compressing the packing springs for disengaging the clutch, said sheet metal members being normally flexed in clutch engaged position and serving to shift said driving member axially when said packing springs are compressed, said sheet metal members being circumferentially corrugated or waved.

15. In a clutch, the combination of a flywheel provided with a circumferential recess, a cover plate mounted in the recess, a plurality of circumferentially corrugated sheet metal members also secured to the flywheel and extending radially inward, a clutch driving member carried by said sheet metal members, a plurality of sheet metal members secured to the cover plate and extending radially outward, a clutch driving member carried by said second named sheet metal members, means for shifting said driving members axially, driven members frictionally engaged by said driving members, means for retracting the second mentioned driving member which effects flexing of the second mentioned sheet metal members, said first mentioned sheet metal members being normally flexed in clutch engaged position and serving to shift the first mentioned driving member when said means is actuated to shift the second mentioned driving member.

16. In a clutch, the combinatiton of a flywheel, a driving member shiftable axially with respect to the flywheel, a plurality of circumferentially disposed radially extending metal members connected to the flywheel and the driving member at their inner and outer ends whereby to support the driving member and hold the same centered and balanced, said metal members being flexible to permit of the relative axial movement, and said metal members being circumferentially corrugated to permit of variation of distance between said points of connection.

17. In a clutch, the combination of a flywheel, a driving member shiftable axially with respect to the flywheel, a plurality of circumferentially disposed metal members connected respectively at opposite ends to the flywheel and driving member whereby to support the driving member and hold the same centered and balanced, said metal members being flexible to permit of the relative axial movement, and said metal members being corrugated substantially circumferentially to permit of variation of length between the connected ends.

18. In a clutch, the combination of a flywheel, a driving member, a cover plate, a flexible metal member attached, respectively, to the driving member and cover plate for carrying the driving member, said flexible member permitting relative axial movement between the driving member and other parts, and said cover plate having a flexible portion to which the flexible metal-carrying member is attached.

19. In a clutch, the combination of a flywheel, a cover plate slotted to provide separate carrying portions, flexible sheet metal members secured to these carrying portions, a pressure ring or the like secured to and carried by said flexible metal members, said flexible metal members permitting axial shifting of the pressure ring, said separate carrying parts of the cover plate being sufficiently flexible to permit of straight line axial movement of the points of connection between the pressure ring and the flexible sheet metal members.

20. A carrier member for a shiftable part of a friction clutch comprising a member composed of a single piece of sheet metal adapted for connection at one end to a clutch member to be carried and adapted for connection at its opposite end to a carrying clutch member, one end arranged for connection at one point and the other end arranged for connection at a plurality of points, the sheet metal constituting the member being corrugated with the corrugations disposed between the said ends of the member which are adapted for connection and disposed transversely relative to the direction of extent of one of said connected ends to the other, whereby said sheet metal member may lengthen or contract for variance in distance between the said ends adapted for connection.

ERNEST E. WEMP.